United States Patent [19]

Evans, Jr. et al.

[11] Patent Number: 5,239,399
[45] Date of Patent: Aug. 24, 1993

[54] ELECTRICAL-OPTICAL INTERFACE DEVICE

[75] Inventors: Joseph T. Evans, Jr.; Jeff A. Bullington, both of Albuquerque, N. Mex.

[73] Assignee: Radiant Technologies, Albuquerque, N. Mex.

[21] Appl. No.: 748,621

[22] Filed: Aug. 22, 1991

[51] Int. Cl.$^5$ ..................... H04J 14/00; H04B 10/04
[52] U.S. Cl. .................................. 359/117; 359/180; 359/158; 359/139; 359/128; 375/38
[58] Field of Search ............... 359/184, 185, 186, 180, 359/154, 158, 117, 128, 139; 385/16; 375/21, 38

[56] References Cited
U.S. PATENT DOCUMENTS 4,736,462  4/1988  Joel, Jr. ............................... 359/158
4,850,046  7/1989  Philippe ............................. 359/184

Primary Examiner—Edward L. Coles, Sr.
Assistant Examiner—Kinfe-Michael Negash
Attorney, Agent, or Firm—McCubbrey, Bartels, Meyer & Ward

[57] ABSTRACT

Devices for converting digital data into a light pulse train and decoding such a pulse train are disclosed. The light pulse generating device generates a train of light pulses having a pattern determined by a numerical value represented by a plurality of binary bits. The light pulse train generating device stores the bits in a register. Each cell of the register is connected to a light switching device that will interrupt a first light beam in response to a light signal if the value stored in the cell is a logical one. If the value is a logical 0, the interruption will not occur. The decoding device utilizes a plurality of light activated switches to route individual pulses in the light pulse train to different photodetectors. The light activated switching devices avoid the delays inherent in electrically activated switching devices.

3 Claims, 10 Drawing Sheets

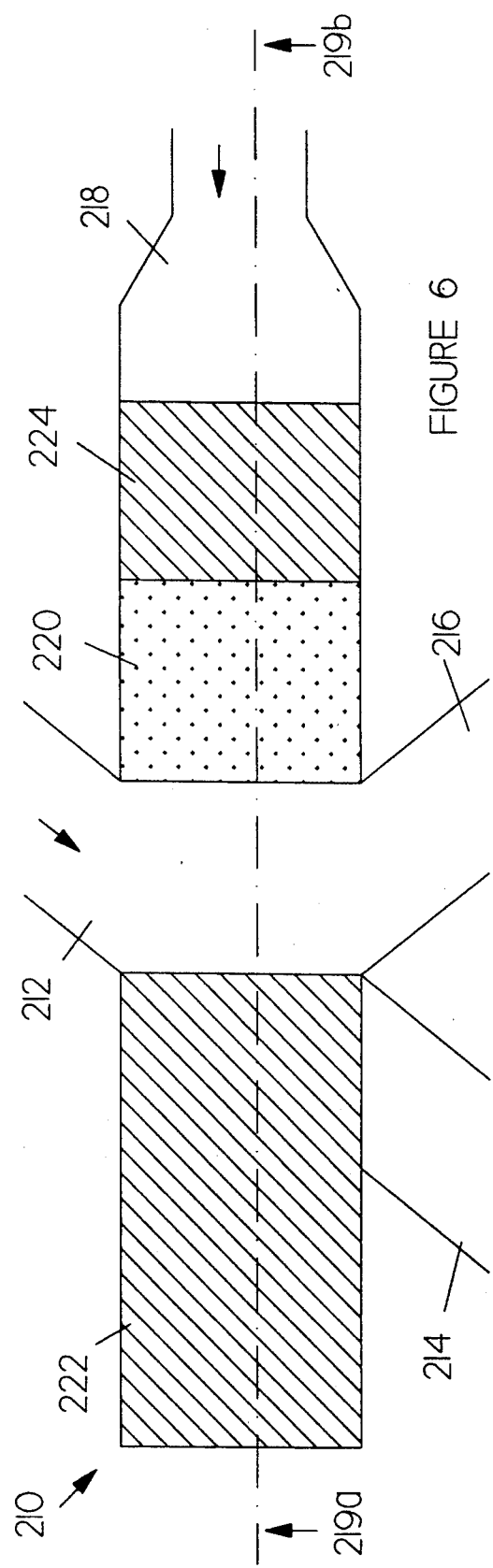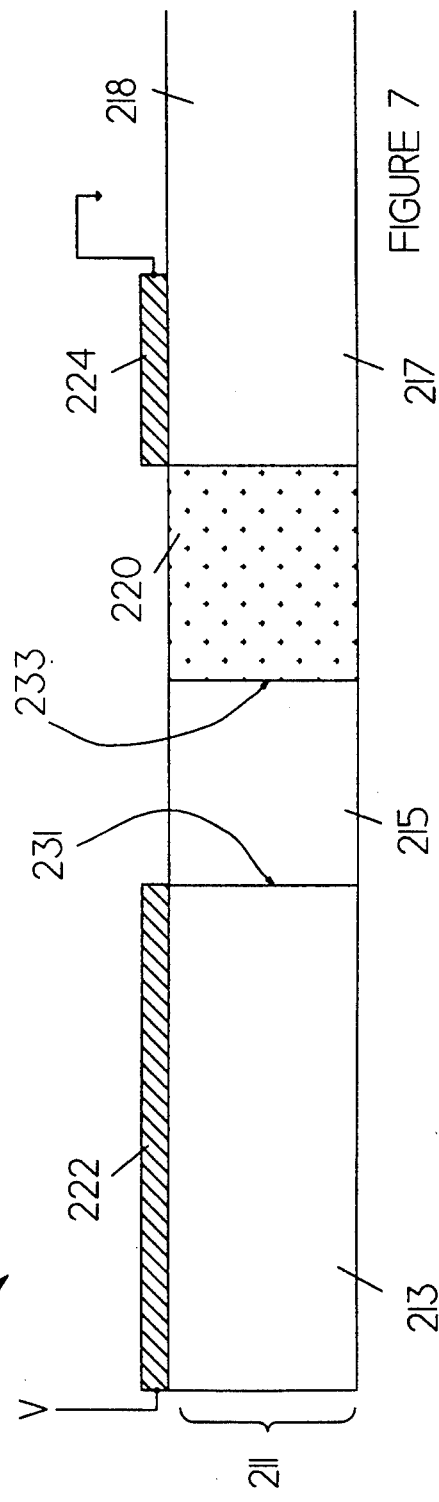

ELECTRICAL-OPTICAL INTERFACE DEVICE

FIELD OF THE INVENTION

The present invention relates to optical transmission systems and more particularly, to devices for introducing data into optical transmission paths.

BACKGROUND OF THE INVENTION

The capacity of an optical fiber to transmit digital information in the form of light pulses far exceeds the capacity of electrical conductors to carry information in the form of electrical pulses. Consequently, numerous information transmission systems in which information is transmitted as a sequence of light pulses in an optical fiber have been constructed or proposed.

The information which is normally communicated in such transmission systems is initially in the form of electrical signals. These signals are typically digital data such as that stored in a computer or generated by modern telecommunications equipment. The rate at which digital data is generated is usually significantly lower than the transmission capacity of an optical fiber. As a result, the data is typically accumulated in a register or other storage system until sufficient data to fill a data packet of a predetermined size has been accumulated. The contents of this data store are then read out to the optical fiber.

At the other end of the optical fiber, the information is typically shifted into a register. The data in this register is then transmitted to the intended receiving device at a speed consistent with the input bandwidth of the receiving device.

Even with currently available electrical circuitry, the rate at which information can be transmitted is significantly lower than that of the devices that interface to the data to the fiber. Consequently, modern transmission systems use a single optical fiber to service a plurality of devices. Such systems utilize time-domain multiplexing. For example, each device accumulates the data it wishes to send. The accumulated data is then inserted into a predetermined time slot in the optical data stream. Similarly, each device includes a circuit which monitors the optical data stream for packets in a predetermined time slot intended for that device. The packets are typically read into buffer registers whose contents are transferred to the device.

The number of devices that may share a single optical fiber depends on the rate at which data can be inserted into the optical transmission stream. In a typical shared transmission system, each device is interfaced to the optical fiber by an interface which is inserted into the fiber. The interface includes a light detector and a laser diode. The interface intercepts each data packet in the segment of the fiber connected to the light detector. Those packets that are not intended for the device connected to the interface are reproduced in the segment of the fiber connected to the laser diode by pulsing the diode. When the device connected to the interface wishes to send a packet, the interface waits for the appropriate time slot and then inserts light pulses into the segment of the fiber connected to the laser diode.

From the above discussion, it will be apparent that the rate at which information can be input to the optical fiber is dependent on the rate at which electrical signals can be generated in response to the light pulses detected in the optical fiber. The rate is also limited by the rate at which the laser diode can be turned on and off. That is, the effective bandwidth of the optical fiber is determined by the rate at which electrical signals can be turned on and off in conventional electrical circuitry. As pointed out above, this rate is significantly lower than that specified by the optical bandwidth of the fiber. Hence, it would be advantageous to provide an interface circuit whose switching speed is not limited by the rate at which electrical signals can be turned on and off.

Broadly, it is an object of the present invention to provide an improved electrical-optical interface unit.

It is a further object of the present invention to provide an electrical-optical interface unit that can switch data into optical transmission paths at a rate which is not limited by the rate at which electrical signals can be turned on and off.

These and other objects of the present invention will become apparent to those skilled in the art from the following detailed description of the invention and the accompanying drawings.

BRIEF DESCRIPTION OF THE DRAWINGS

FIG. 6 is a top view of a basic light switching device utilized in the present invention.

FIG. 7 is a cross-sectional view of the light switching device shown in FIG. 6.

SUMMARY OF THE INVENTION

Figure 1:
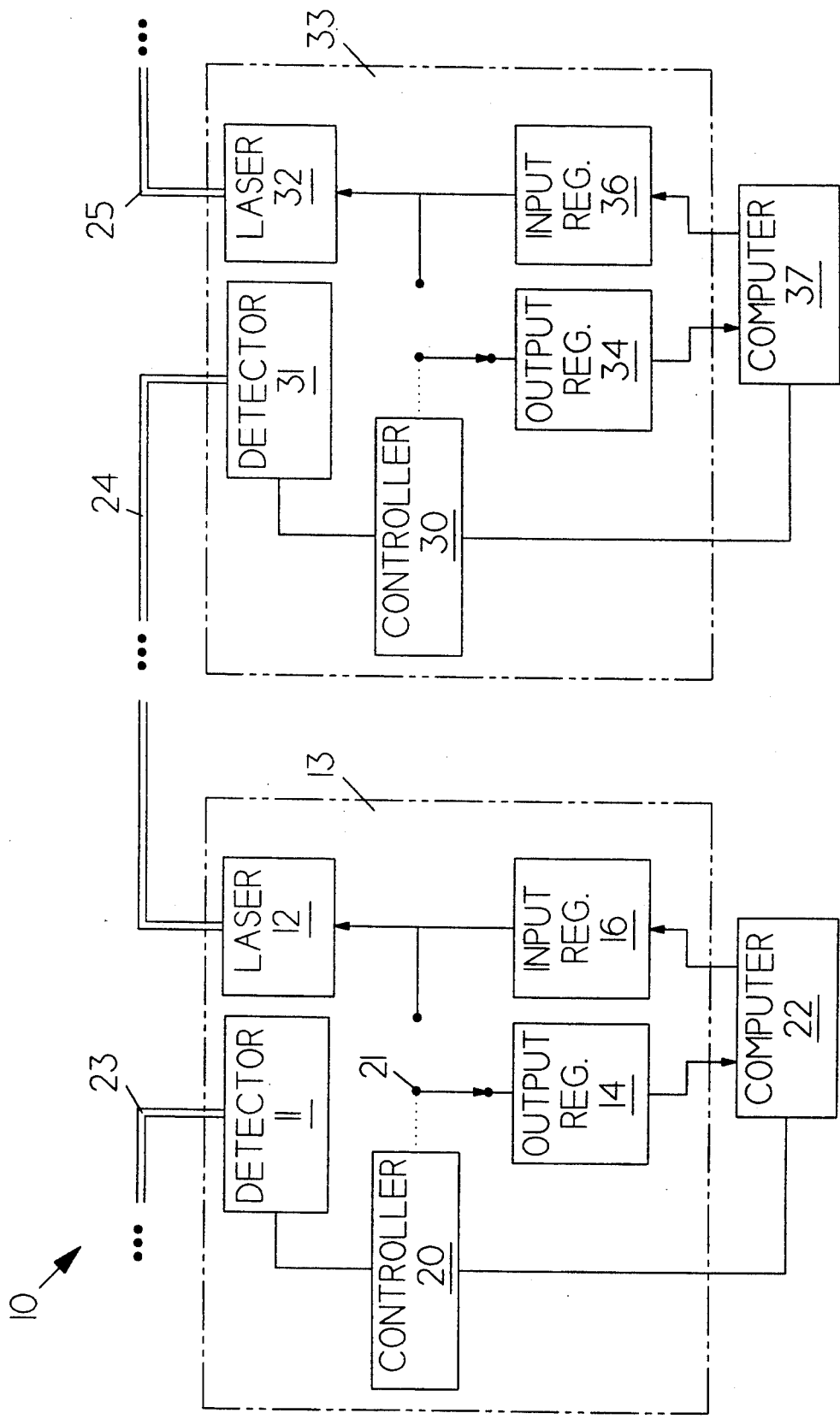
FIG. 1 is a block diagram of two stations in a prior art computer network.

The present invention is a system comprising a light pulse generating device for converting digital data into a light pulse train and a light pulse decoding device for decoding such a pulse train. The light pulse generating device generates a train of light pulses having a pattern determined by a numerical value represented by a plurality of binary bits. The light generating device stores the bits in a register which includes a plurality of storage cells, one said bit being stored in each storage cell. Each storage cell includes a means for generating an electrical signal indicative of the bit stored therein. They have first and second values which are determined by said stored binary bit. The light train generator operates by chopping a light signal from a light source. The light train generator includes a plurality of light switching devices arranged in a linear array having a first light switching device, one or more intermediate light switching devices and a last light switching device. One light switching device is connected to each storage cell. Each light switching device includes an input light pipe, a control light pipe, an output light pipe, and an electrical input terminal. The electrical input terminal is connected to the storage cell connected thereto. The light switching devices are connected in series. The input light pipe of the first light switching device being connected to said light source. The input light pipe of each said intermediate and last light switching device are connected to said output light pipe of the light switching device preceding said light switching device in said linear array. Each light switching device transmits light received through its input light pipe out through its output light pipe if its electrical input terminal is coupled to an electrical signal having said first value. However, if the electrical signal has the second value, each light switching device blocks at least a portion of the light input received through the input light pipe thereby reducing the light leaving through its output light pipe. The light train generator also includes a device for sequentially applying light pulses in a predetermined order to said control light pipes of said light switching devices.

A light pulse decoding device according to the present invention generates electrical signals corresponding to light pulses in a train of light pulses. The pulse decoding device includes a means for receiving said train of light pulses. In addition, the decoding device includes a plurality of light switching devices arranged in a linear array having a first light switching device, one or more intermediate light switching devices and a last light switching device. Each said light switching device includes an input light pipe, a control light pipe, a first output light pipe, and a second output light pipe. The light switching devices are connected in series such that the input light pipe of the first light switching device is connected to said receiving means. The input light pipe of each said intermediate and last light switching device is connected to the first output light pipe of the light switching device preceding said light switching device in said linear array. Each light switching device transmits light received through its input light pipe out of its first output light pipe if no light is present in said control light pipe, and each said light switching device directs at least a portion of the light input through its input light pipe into said second output light pipe if light is present in said control light pipe. A photodetector is coupled to the second output light pipe of each said light switching device. The device is activated by an optical device for sequentially applying light pulses in a predetermined order to said control light pipes of said light switching devices.

DETAILED DESCRIPTION OF THE INVENTION

The present invention may be more easily understood with reference to FIG. 1 which illustrates two stations in a typical prior art computer network 10. The two stations are shown at 13 and 33. Stations 13 and 33 communicate over an optical fiber having segments shown at 23-25. Station 13 provides communication access to network 10 for computer 22. Station 33 provides communication access to network 10 for computer 37. To provide each access to the optical fiber, the optical fiber is interrupted. One end of the interrupted fiber is connected to a detector, the other to a laser diode.

Referring to station 13, segment 23 of the optical fiber is used to receive messages from other devices connected to the optical fiber. Detector 11 converts the incoming messages to electrical signals which are interpreted by controller 20. If the message is directed to computer 22, the message is switched to an output register 14 which is connected to computer 22. When output register 14 is loaded, controller 20 signals computer 22 which then reads the contents of output register 14.

If the message is not intended for computer 22, controller 20 routes the electrical signals generated by detector 11 to laser 12 using switch 21. Laser 12 then regenerates the light signals in segment 24 of the optical fiber. The message is then received by detector 31 in station 33. The various elements of station 33 perform analogous operations to the corresponding elements discussed with reference to station 13.

When computer 22 wishes to send a message to another computer in the network such as computer 37, it loads the message into input register 16 and notifies controller 20 that a message is ready to be sent. Controller 20 then causes the contents of input register 16 to be shifted into laser 12 which generates the light signals corresponding to the message.

It will be apparent from the preceding discussion that the rate at which messages can be sent over the optical fiber is limited by the rate at which detectors 11 and 31 can decode incoming trains of light pulses and store them in output registers 14 and 34, respectively. Similarly, the rate is limited by the speed with which lasers 12 and 32 can convert the contents of input registers 16 and 36 to light signals.

Both of these steps are limited by the speed with which electrical components can switch electrical signals on and off. Detector 11 is limited by the response of the photo-diode or equivalent transducer therein and by the speed with which the signals generated can be shifted into output register 14. Similarly, laser 12 is limited by the rise and fall times of the electrical signals input thereto and by the speed with which information stored in input register 16 can be shifted into laser 12.

The number of computers that can share a network such as that illustrated in FIG. 1 depends on the rate at which light pulses can be sent over the optical fiber. As noted above, this rate is limited by the rate at which electrical signals can be turned on and off, not by the rate at which the optical fiber can transmit signals. In general, this latter rate is a factor of 10 to 100 higher. Hence, the potential of optical fibers is poorly utilized by prior art interfacing systems.

A second problem with this type of prior art network is its vulnerability to component failure. If there is a component failure in detector 11, controller 20, laser 12, or switch 21, or an analogous component in any of the other stations, the entire network can be rendered inoperative. A failure in any of these components is equivalent to breaking the optical fiber. Ideally, such a failure should only affect communications with the computer connected to the station having the failed component.

Figure 2:
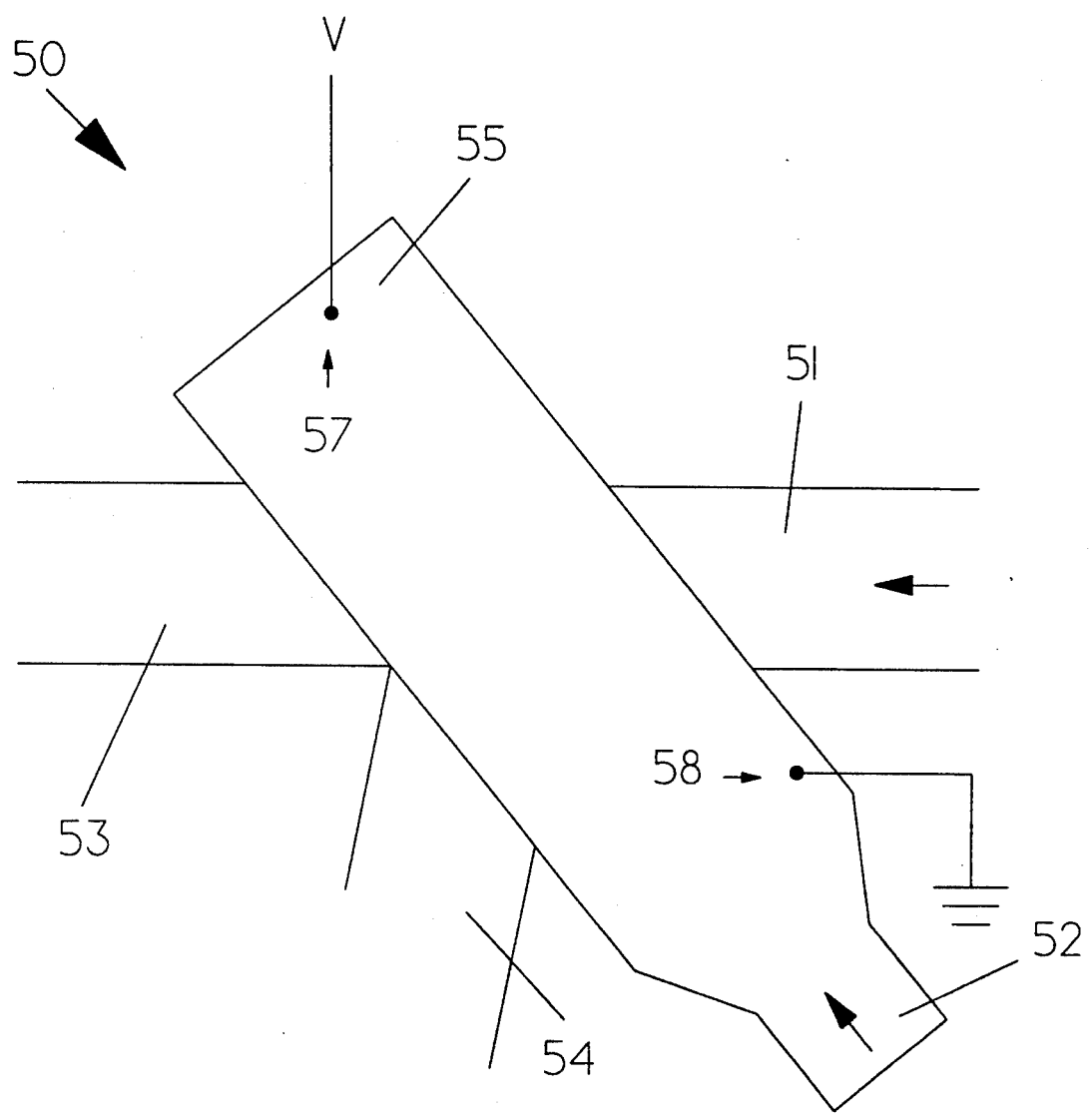
FIG. 2 is a diagram of a light switching device according to the present invention.

The network interface system according to the present invention provides a means for overcoming those limitations. The various components utilized in the present invention are based on a novel light switching device. FIG. 2 is a diagrammatic view of a light switching device 50 according to the present invention. Light switching device 50 includes a switch body 55 which may be coupled to an input light pipe 51, two output light pipes 53 and 54, and a control light pipe 52. In addition, light switching device 50 includes two terminals 57 and 58 for applying a potential difference thereacross. Potentials of V and ground are shown in FIG. 2. To simplify the following discussion, terminal 57 will be referred to as the voltage input to the light switching device. It will be assumed that terminal 58 is connected to ground. However, it will be apparent to those skilled in the art that other potential arrangements will also function.

In the absence of light in control light pipe 52 and/or of a sufficient potential difference between terminals 57 and 58, light entering input light pipe 51 exits through output light pipe 53. When light is present in control light pipe 52 and a sufficient potential difference is applied between terminals 57 and 58, light entering input light pipe 51 exits through output light pipe 54. The manner in which the functionality described above with reference to light switching device 50 is achieved will be discussed in detail below. To simplify the following discussion, light pipe 53 will be referred to as the non-switched output of the light switching device and light pipe 54 will be referred to as the switched output of the light switching device.

Figure 3:
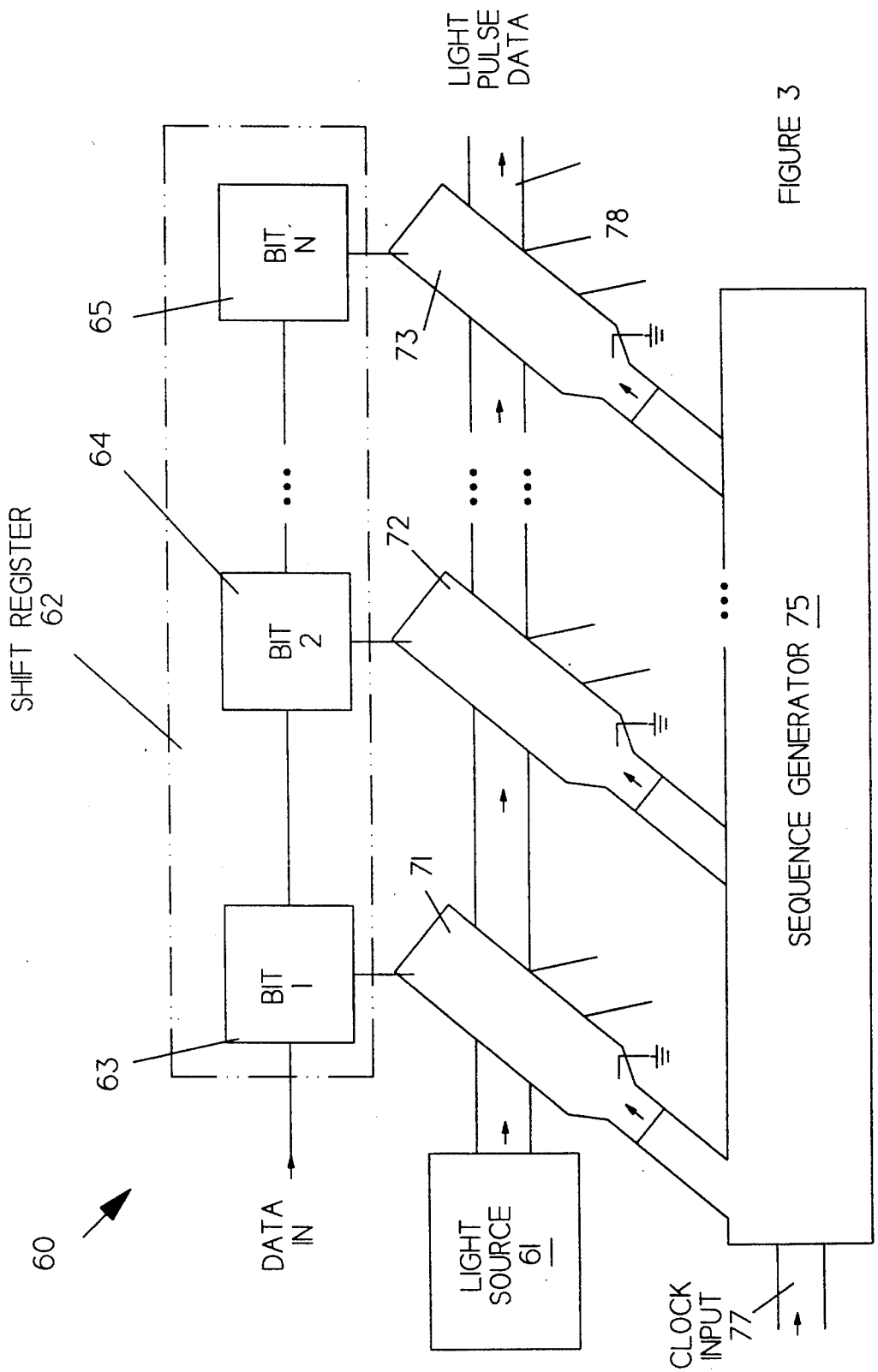
FIG. 3 is a diagram of a pulse train generator according to the present invention.

The manner in which a plurality of light switching devices may be combined to form a pulse train generator 60 is shown in FIG. 3. Pulse train generator 60 generates a sequence of light pulses in a light pipe 78 in response to data stored in a shift register 62. Pulse train generator 60 serves a function analogous to the combination of input register 16 and laser 12 in FIG. 1. As will now be explained, the spacing of these light pulses does not depend on the speed with which electrical signals can be turned on and off.

Data is shifted into shift register 62 prior to commencing the generation of the pulse train. Shift register 62 includes N bits, each stored in a conventional memory cell. Exemplary memory cells are shown at 63-65. Pulse train generator 60 includes one light switching device according to the present invention for each memory cell in shift register 62. The light switching devices corresponding to memory cells 63-65 are shown at 71-73, respectively. The voltage input of each light switching device is connected to the output of the corresponding memory cell. Hence, if the memory cell is in the first of its two possible states, voltage will be applied to the voltage input of the light switching device. If, however, the memory cell is in the other of its two states, no voltage will be applied to the voltage input of the light switching device.

The light switching devices are connected in series with a constant light source 61. The input light pipe of each light switching device is connected to the non-switched output of the preceding light switching device. The input light pipe of the first light switching device 71 is connected to light source 61. The switched outputs of the light switching devices are not used in pulse train generator 60.

Pulse train generator 60 includes a sequence generator 75 which provides light pulses to the control light pipes of the various light switching devices. The manner in which sequence generator 75 is constructed will be discussed in more detail below. For the purposes of the present discussion, it is sufficient to note that sequence generator 75 generates a light pulse sequentially to each control light pipe in response to a light clock signal which is input through light pipe 77. That is, on the first light pulse input through light pipe 77, a pulse is sent to the control light pipe of light switching device 71. On the second light pulse input through light pipe 77, a pulse is sent to the control light pipe of light switching device 72, and so on. The manner in which the light clock signals are generated will also be described in detail below.

The light clock signals are enabled at the beginning of the pulse train generation. Sequence generator 75 sequentially selects each of the light switching devices. If the light switching device in question is connected to a memory cell having a high output voltage, the light from light source 61 will be interrupted, thereby creating an intensity pulse in the light pulse data exiting light pipe 78. If, on the other hand, the memory cell in question has a low output voltage, no interruption of the light from light source 61 will occur. This latter result follows from the fact that a light switching device only interrupts the light beam passing through it if light is present in its control light pipe and if voltage is present at its voltage input.

Figure 4:
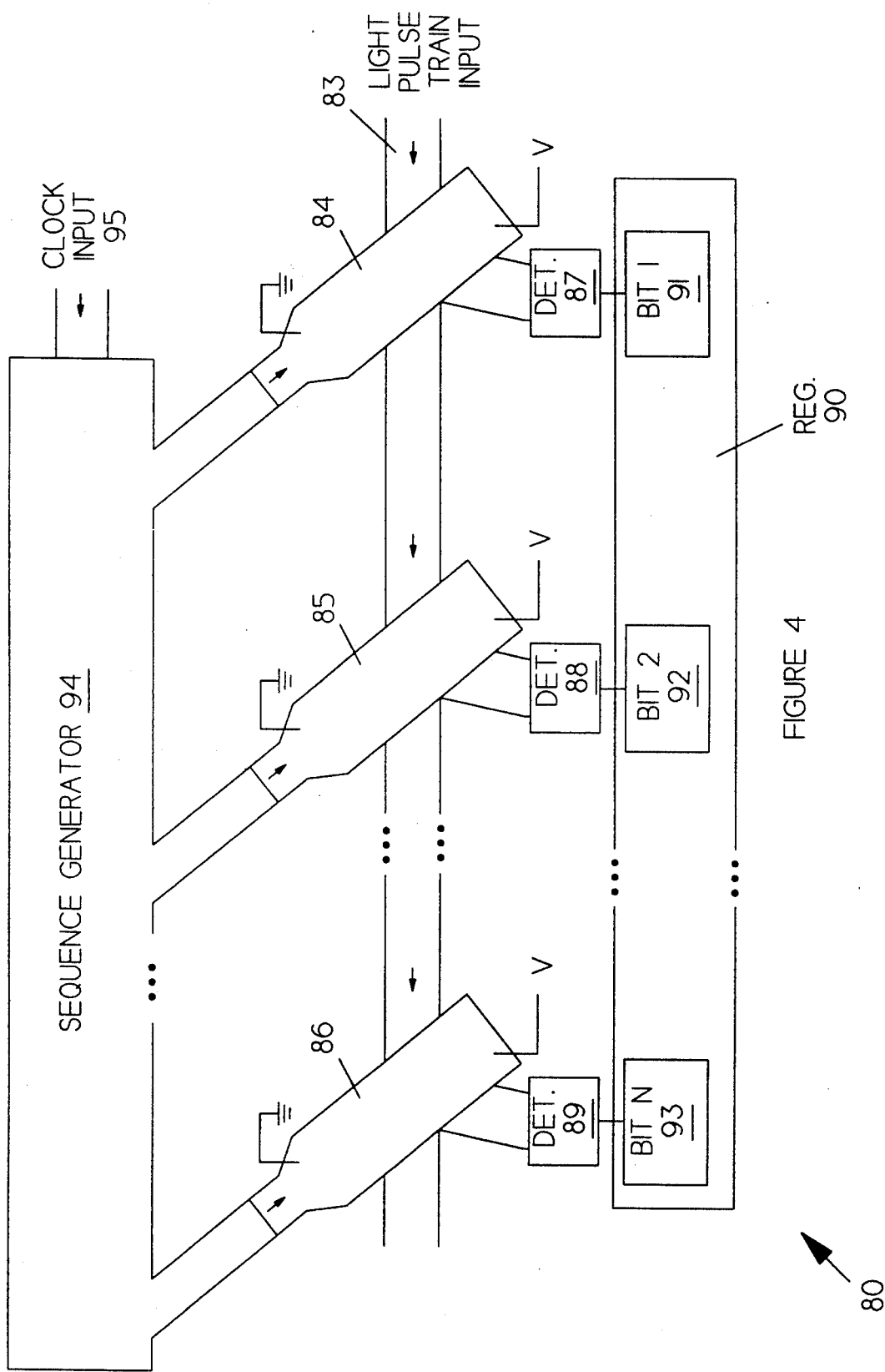
FIG. 4 is a diagram of a light train decoding circuit according to the present invention.

A light train decoding circuit 80 for converting a sequence of N light pulses to electrical signals is shown in FIG. 4. Light train decoding circuit 80 serves a function analogous to that of detector 11 and output register 14 shown in FIG. 1. However, light train decoding circuit 80 is not limited by the speed with which electrical signals can be turned on and off.

Referring to FIG. 4, the pulse train to be decoded is input through light pipe 83 which is connected to the input of the first of N light switching devices connected in series. Exemplary light switching devices are shown at 84-86. The switched output of each light switching device is connected to a photodetector whose output is stored in a corresponding memory cell of a register 90. The photodetectors corresponding to light switching devices 84-86 are shown at 87-89, respectively. The memory cells corresponding to light switching devices 84-86 are shown at 91-93, respectively. The voltage inputs of each of the light switching devices are connected to a power source which provides a constant potential difference of V during the decoding operation.

The control light pipe of each of the light switching devices is connected to a sequence generator 94 which is driven by a light clock pulse input 95. Sequence generator 94 operates in the same manner as sequence generator 75 shown in FIG. 3. That is, it pulses each of the light switching devices in sequence.

As each light switching device is pulsed, the portion of the input light pulse train corresponding to that light clock pulse will be switched to the detector attached to the light switching device in question. If light was present at that point in the light pulse train, it will be detected by the light detector and the result stored in the corresponding register. For example, when light switching device 84 is pulsed, the input light pulse train is sampled at the position corresponding to the first bit in the light pulse train. If the bit is in the first of the two possible binary states, light will be present at this point in the pulse train. If the bit is in the other of the two states, no light will be present. If light is present, detector 87 will receive a light signal which will be converted by detector 87 to an electrical signal that is then stored in memory cell 91.

It should be noted that detector 87 and the other detectors may have response times which are much longer than the time between light pulses in the input light pulse train. The light switching device attached to each detector isolates a single light pulse. Hence, the detector need only determine the intensity of the light pulse. The detector does not need to determine the time at which the light pulse was received.

Figure 5:
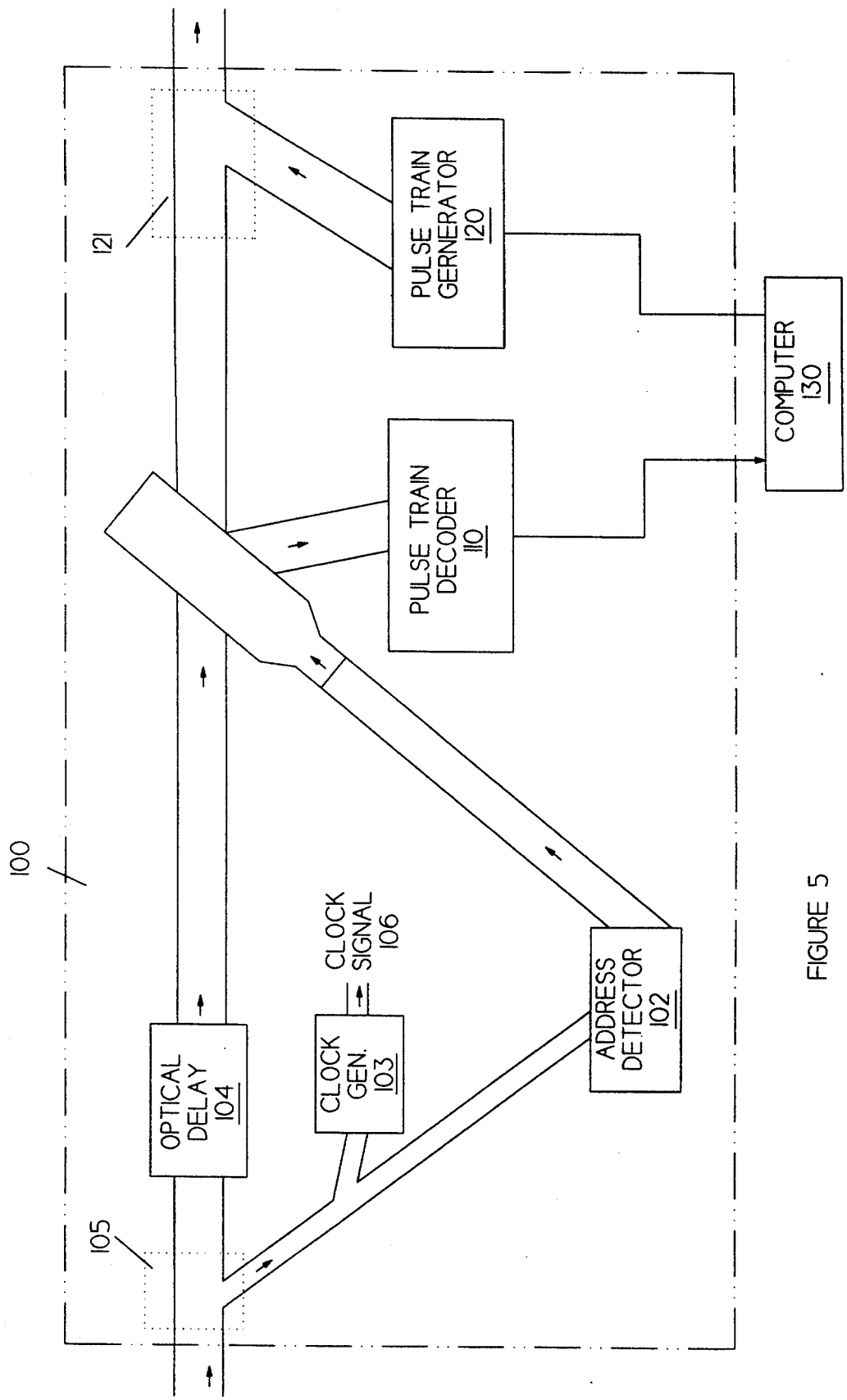
FIG. 5 is a diagram of a computer network interface station according to the present invention.

A pulse train generator and decoder according to the present invention can be combined to provide a computer interface station for interfacing a computer to a network utilizing an optical fiber. An exemplary network interface station 100 is shown in FIG. 5. The network utilizes optical fiber 101 for communicating data packets comprising optically encoded light pulses. It is assumed that each packet begins with a sequence of pulses specifying the address of the computer which is to receive the packet in question. In addition, a clock sequence of light pulses is assumed to be present in fiber 101. The clock sequence is preferably encoded at a wavelength different from that used to send the data packets. Wavelength multiplexing is well known in the optical signal processing arts, and hence will not be described in further detail here.

A small fraction of the light in fiber 101 is diverted at the entrance to interface station 100 by a beam splitter 105. A clock generating circuit 103 detects the clock signals from fiber 101 and generates the corresponding pulse train 106. Pulse train 106 is input to the various optical components requiring clock signals, such as address detector 102, pulse train decoder 110, and pulse train generator 120. To simplify FIG. 5, these optical connections have been omitted.

Address detector 102 decodes the address portion of the data packet and matches it against the address corresponding to interface station 100. Address detector 102 is preferably constructed from a plurality of optical AND gates which are constructed from light switching devices according to the present invention. The manner in which a light switching device according to the present invention may be configured to provide an AND gate will be described in detail below.

Address detector 102 also includes an optical one-shot for generating a light pulse of sufficient duration to activate light switching device 107. The manner in which a light switching device according to the present invention may be utilized to construct an optical one-shot will be described in detail below.

To allow sufficient time for address detector 102 and light switching device 107 to function, an optical delay 104 is introduced into fiber 101. Optical delay 104 may be constructed from a small length of optical fiber.

If the address of the data packet matches that of interface station 100, the data packet is diverted to pulse train generator 110 by light switching device 107. Upon completion of the decoding operation, light switching device 107 signals computer 130 that a data packet is available. The electrical connections for providing this signaling have been omitted to simplify FIG. 5.

When computer 130 wishes to send a data packet to another computer in the network, it loads the data packet into the register in pulse train generator 120. At a time determined by clock signal 106, pulse train generator 120 generates the corresponding light signals which are introduced into fiber 101 at junction 121.

It should be noted that the components of interface station 100 may fail without interrupting communications on the remaining portion of the network. As will be pointed out in more detail below, if light switching device 107 fails, the non-switched light path continues to function. Hence, the only component in interface station 100 that is capable of disrupting the network is pulse generator 120 which could, in principle, fail by continually sending light pulses.

The manner in which a light switching device according to the present invention is constructed will now be discussed in detail. This device may be most easily understood with reference to FIGS. 6 and 7. FIG. 6 is a top view of a light switching device 210 according to the present invention. FIG. 7 is a cross-sectional view of light switching device 210 taken through line 219a-219b. Light switching device 210 accepts light through an input light pipe 212 and transmits that light either through output light pipe 214 or output light pipe 216. If no light is input to control light pipe 218, the light from input light pipe 212 exits through output light pipe 214. However, if light having a wavelength less than a predetermined wavelength is input to control light pipe 218, the light from input light pipe 212 exits through output light pipe 216.

Light switching device 210 is preferably constructed from a thin optically transparent layer 211 of paraelectric material. The manner in which this layer is deposited and processed will be discussed in more detail below. For the purpose of the present discussion, it is sufficient to note that layer 211 is divided into four regions, 213, 215, 220, and 217. Region 213 is a portion of layer 211 which underlies an electrode 222. Adjacent thereto is region 215. The interface between regions 213 and 215 is shown in FIG. 7 at 231. When no light is input to control light pipe 218, regions 213 and 215 have the same index of refraction. For reasons that will become apparent from the following discussion, region 215 will be referred to as the modulation region.

Adjacent to modulation region 215 is the third region which will be referred to in the following discussion as photoconductive region 220. Photoconductive region 220 is preferably constructed by ion implantation of thin film 211. The details of the ion implantation will be discussed in more detail below. For the purposes of the present discussion, it is sufficient to note that photoconductive region 220 is essentially an electrical insulator in the absence of illumination. When illuminated with light, photoconductive region 220 becomes an electric conductor. The light in question is the light input through control light pipe 218. The boundary between photoconductive region 220 and modulation region 215 is shown at 233 in FIG. 7.

The fourth region 217 underlies a second electrode 224 and connects photoconductive region 220 to control light pipe 218.

A constant potential difference of V is generated between electrodes 222 and 224 by connection to suitable potential sources. For the purposes of this discussion, it will be assumed that electrode 222 is connected to a potential V and electrode 224 is connected to ground. However, it will be apparent to those skilled in the art that other choices of potentials will also function adequately.

Light switching device 210 switches the light input through light pipe 212 to output light pipe 216 by altering the index of refraction of modulation region 215. When modulation region 215 has a sufficiently different index of refraction from region 213, the boundary at interface 231 will reflect light incident thereon. If the angle of incidence of the light is sufficiently shallow with respect to interface 231, the light will be totally reflected from boundary 231. The angles in question will be discussed in more detail below.

As noted above, region 213 and modulation region 215 are preferably constructed from a thin film of paraelectric material. In the absence of an electric field in modulation region 215, it will have the same index of refraction as region 213. Hence, no boundary will exist between the two regions. As a result, light entering light pipe 212 will traverse modulation region 215 and region 213 and then exit through output light pipe 214.

Figure 8:
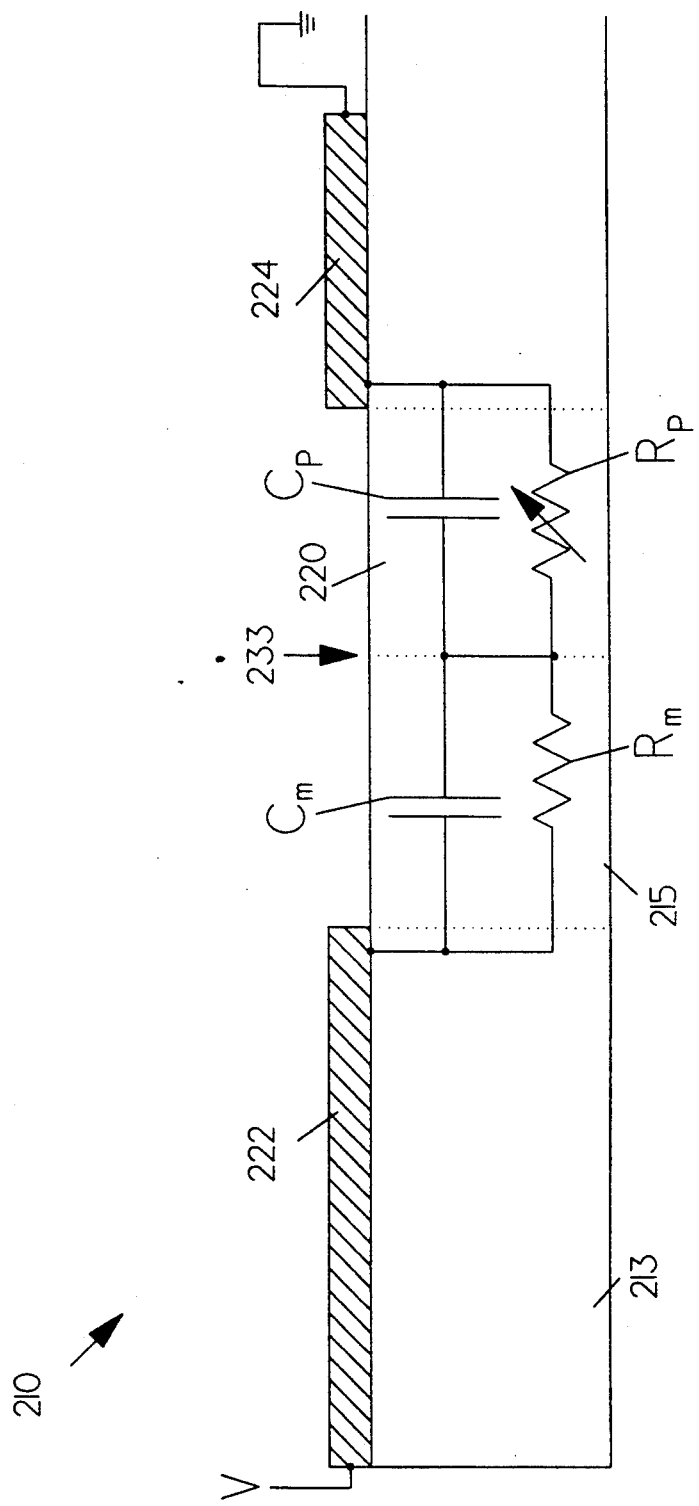
FIG. 8 is an equivalent circuit of the light switching device shown in FIG. 6.

The manner in which an electric field is generated in modulation region 215 in response to light being input through control light pipe 218 will now be explained with the aid of FIG. 8. FIG. 8 is an equivalent circuit for light switching device 210. Modulation region 215 is electrically equivalent to the parallel combination of capacitor $C_m$ and resistor $R_m$. In the preferred embodiment of the present invention, $R_m$ is typically $10^{12}$ ohms. Capacitor $C_m$ is the capacitance between electrode 222 and interface 233.

Photoconductive region 220 is electrically equivalent to the parallel combination of capacitor $C_p$ and variable resistor $R_p$. $C_p$ is the capacitance between interface 233 and electrode 224. In the absence of light, $R_p$ is very large. As will be discussed below in more detail, in the preferred embodiment of the present invention, $R_p$ is typically $10^{14}$ ohms. In the presence of light, $R_p$ is typically a few hundred ohms.

The manner in which the change in value of $R_p$ is utilized in the present invention to switch the index of refraction of modulation region 215 is most easily understood by considering the steady state voltage at interface 233. In the presence of light, $R_p$ is much smaller than $R_m$. In this case, interface 233 will be essentially at ground. As a result, the voltage drop across modulation region 215 will be V. That is, there will be a substantially constant electric field in modulation region 215. As noted above, modulation region 215 may comprise either a paraelectric or ferroelectric material. Assuming that the modulation region comprises a paraelectric material, it will be appreciated by those skilled in the art that the index of refraction will change in response to an electric field being generated therein. Hence, when light is present in photoconductive region 220, an electric field will be present in modulation region 215, causing a change in its index of refraction. However, no such field will be present in region 213. Hence, interface 231 shown in FIG. 7 will separate regions of differing indices of refraction.

When no light is incident on photoconductive region 220, $R_p$ is much larger than $R_m$. In this case, the potential at interface 233 will be substantially equal to V, the same potential as electrode 222. Thus, there will be substantially no potential difference between electrode 222 and interface 233. As a result, the electric field in modulation region 215 will be substantially equal to that in region 213. Since region 213 and modulation region 215 are constructed from the same material, the interface 231 will be absent.

As noted above, $R_m$ and $R_p$, when no light is present in photoconductive region 220, are quite large. It is an object of the present invention to construct a light switching device that switches quickly. The transient response of light switching device 210 depends on $C_m$ and $C_p$. As will now be explained in detail, the preferred embodiment of the present invention is constructed such that $C_m$ is much larger than $C_p$.

Consider the case in which light is present in photoconductive region 220 and then is suddenly turned off. Just before the light is turned off, the potential at interface 233 is substantially equal to ground. Just after the light is turned off, insufficient time will have elapsed for current to flow through $R_m$ to charge $C_p$. Hence, the circuit will appear to be a simple pair of series connected capacitors. Thus, the potential of V will appear across the series combination of $C_m$ and $C_p$. To obtain fast switching, the potential at interface 233 must jump to V. This will be the case if $C_m$ is much larger than $C_p$.

In the preferred embodiment of the present invention, this is accomplished by altering the dielectric constant of photoconductive region 220. As will be explained in more detail below, the dielectric constant of photoconductive region 220 can be reduced by ion bombardment of said region.

In the case in which photoconductive region 220 is suddenly exposed to light after being in the dark, there is no capacitive charging problem. In this case, interface 233 is directly connected to ground through resistor $R_p$ which is only of the order of 1000 ohms when photoconductive region 220 is exposed to light. As long as $RC_p$ is small compared to the rise time of the light pulse incident through control light pipe 218, light switching device 210 will switch in a time comparable to the rise time of said light pulse. Here, R is the value of $R_p$ in the presence of light.

The manner in which light switching device 210, illustrated in FIGS. 6 and 7 and described in detail above, functions as an optical AND gate will now be described. It has been shown that light switching device 210 provides an optical output signal at output light pipe 216 when an optical input signal is present both at input light pipe 212 and at control light pipe 218. In addition, it has been shown that the device does not provide an optical output signal at output light pipe 216 if the optical input signal is absent either at input light pipe 212 or at control light pipe 218. This constitutes the operation of a traditional AND gate having inputs 212 and 218, and having output 216. Thus, a plurality of light switching devices 210 can be configured to serve as the AND gates required in the address detector 102 described with respect to FIG. 5 above.

In the preferred embodiment of the present invention, regions 213, 215, 220, and 217 are constructed from a thin film of paraelectric or ferroelectric material which is deposited on the surface of a suitable substrate. The material in question is preferably a lead lanthium zirconate titanate (PLZT). By adjusting the composition of the constituents, the material can be caused to be either paraelectric or ferroelectric. The film is typically a structure of the form $ABO_3$ where the A site may be filled by either lead or lanthium and the B site may be filled with either zirconium or titanium. A paraelectric film may be obtained by adjusting the composition of the A site to 91% and lanthium and the B site to 65% zirconium and 35% titanium. A ferroelectric film may be obtained by omitting the lanthium from the A site and adjusting the composition of the B site to 60% zirconium and 40% titanium. Other compositions will be apparent to those skilled in the art.

The material may be deposited on the substrate using sputtering, chemical vapor deposition, or sol gel deposition. The preferred method of deposition is the conventional sol gel deposition technique. In this technique, a solution of the PLZT material is spun onto the substrate. The solution consists of a solvent carrying a metal organic complex which has been partially jelled into long chains. The chains consist of a linear array of metal atoms alternating with oxygen atoms and coordinated with hydrocarbon groups along the outside of the linear array. The chains are normally formed by hydrolysis of alkoxides which are individual metal atoms bonded to the hydrocarbons. The alkoxides are mixed to produce the desired ratio of metal atoms in the final ceramic and then water is added to the mixture. The water hydrolyzes the individual alkoxide molecules into the chains which remain suspended in the solvent. In this way, metal oxide molecules are dissolved in solvents such as simple alcohols.

The sol gel is spun onto the substrate using a conventional spinning apparatus. The solvent evaporates during the spinning, leaving the surface of the substrate coated with metal organic chains. The substrate is then heated gradually to evaporate the remaining solvent. After the solvent has been evaporated, the coated substrate is heated further to break the hydrocarbon bonds. As a result, hydrogen, carbon, and oxygen are released, leaving a coating of metals and oxygen. The substrate is then raised to a temperature which sinters the amorphous layer into its ceramic form. For PLZT, the hydrocarbons evaporate below 400 degrees Centigrade.

After deposition, the film is sintered to form the final ceramic layer. The temperature at which the film is sintered may also be used to control the properties of the film. For example, if a 98% lead, 2% lanthium, 65% zirconium, and 35% titanium composition is used, the final film will be a ferroelectric if heated to 550 degrees Centigrade. However, if the sintering takes place between 400 and 500 degrees Centigrade, a pyrochlore structure will be formed. Such a structure is paraelectric as opposed to the perovskite structure obtained at the higher temperature which is ferroelectric.

For the purposes of the present discussion, it will be assumed that modulation region 215 is a paraelectric structure. The use of ferroelectric structures will be discussed in more detail below.

For PLZT materials, the difference in the indices of refraction between the two states of polarization is approximately equal to 0.002. PLZT materials are preferred because this is among the highest differences in the index of refraction that can be obtained with a material capable of withstanding the temperatures used in conventional semiconductor processing. It will be apparent to those skilled in the art that it would be advantageous to be able to construct light switching devices on the same substrate as conventional integrated circuits.

Photoconductive region 220 is also preferably constructed from the same thin PLZT film. After deposition, photoconductive region 220 is differentiated from modulation region 215 by the introduction of ions that will cause it to become photoconductive when illuminated with light having a wavelength less than a predetermined critical wavelength. The ions in question can be introduced by ion implantation techniques or other conventional techniques such as diffusion. It should be noted that the process of ion implantation also reduces the dielectric constant of the PLZT film. It has been found that a difference in dielectric constant of a factor of 210 can be obtained by ion implantation.

In the absence of doping, PLZT materials become photoconductive when illuminated with light having a wavelength less than 0.35 microns. If photoconductive region 220 is doped with argon and nickel ions, this critical wavelength can be increased to approximately 0.57 microns. If iron ions are used, the wavelength is increased to approximately 0.7 microns. Finally, if neodymium or silicon ions are used, the wavelength can be extended to approximately 1 micron. The above ion implantation can be effected at energies between 50 Kev and 100 Kev is photoconductive region 220 is approximately 0.5 microns in thickness. The final concentration is preferably about $10^{18}$ ions/cm$^3$.

The critical wavelength is preferably longer than that of the light input through input light pipe 218. Hence, neodymium and silicon ions are preferred. This allows light switching devices according to the present invention to be utilized for switching light for the purposes of controlling other light switching devices in complex optical systems.

The angle at which input light pipe 212 introduces light into modulation region 215 depends on the difference in the index of refraction of modulation region 215 and region 213 when photoconductive region 220 is exposed to light. In the preferred embodiment of the present invention, this angle is sufficient to cause the light from input light pipe 212 to be totally internally reflected from interface 231. The reflected light exits light switching device 210 through output light pipe 216. As noted above, the preferred embodiment of the present invention utilizes PLZT materials in which a difference in the index of refraction of about 0.002 may be generated. For these materials, the angle of incidence of light on interface 231 must be at least 88.5° with respect to the normal surface of interface 231.

However, it will be apparent to those skilled in the art that total internal reflection is not always required. For example, in those applications in which only the light exiting through output light pipe 216 is utilized, partial reflection from interface 231 is sufficient.

As noted above, the preferred material for constructing the modulation region and control region is PLZT. This material has the highest difference in the index of refraction of any non-organic material. Since it is important that both the modulation region and photoconductive region be able to withstand the temperatures inherent in semiconductor processing, organic materials are not suitable. In addition, by adjusting the composition of the PLZT materials, modulation regions which are either paraelectric or ferroelectric can be obtained. In general, if a fast switching device is required, a paraelectric material is preferred since it returns to the same state of polarization after the electric field is removed.

Although a paraelectric material is preferred in most applications because of the long reset time associated with a ferroelectric material, there are applications, such as the sequence generator discussed below, where a ferroelectric material is preferred. These are applications in which it is advantageous to change the index of refraction of the modulation region in such a way as to guarantee that the index of refraction will remain at the new value even if power is lost. If the modulation region is ferroelectric, then the index of refraction can be changed in such a manner. Unfortunately, to change the index index of refraction back to the original value, the potential V must be varied in a manner dictated by the hysteresis curve which characterizes the material. Hence, the light switching device cannot be switched back in a time which is independent of the speed with which an electrical potential can be switched.

The optical network interface station described above and shown in FIG. 5 requires a clock signal that operates at speeds significantly greater than those obtainable by switching electrical signals. A light switching device according to the present invention may be used to construct an optical oscillator which is capable of providing such a clock signal. The optical oscillator according to the present invention is comprised of a light switching device with an optical feedback loop which causes the output of the device to switch at a uniform predetermined rate in a manner analogous to a classical relaxation oscillator.

Figure 9:
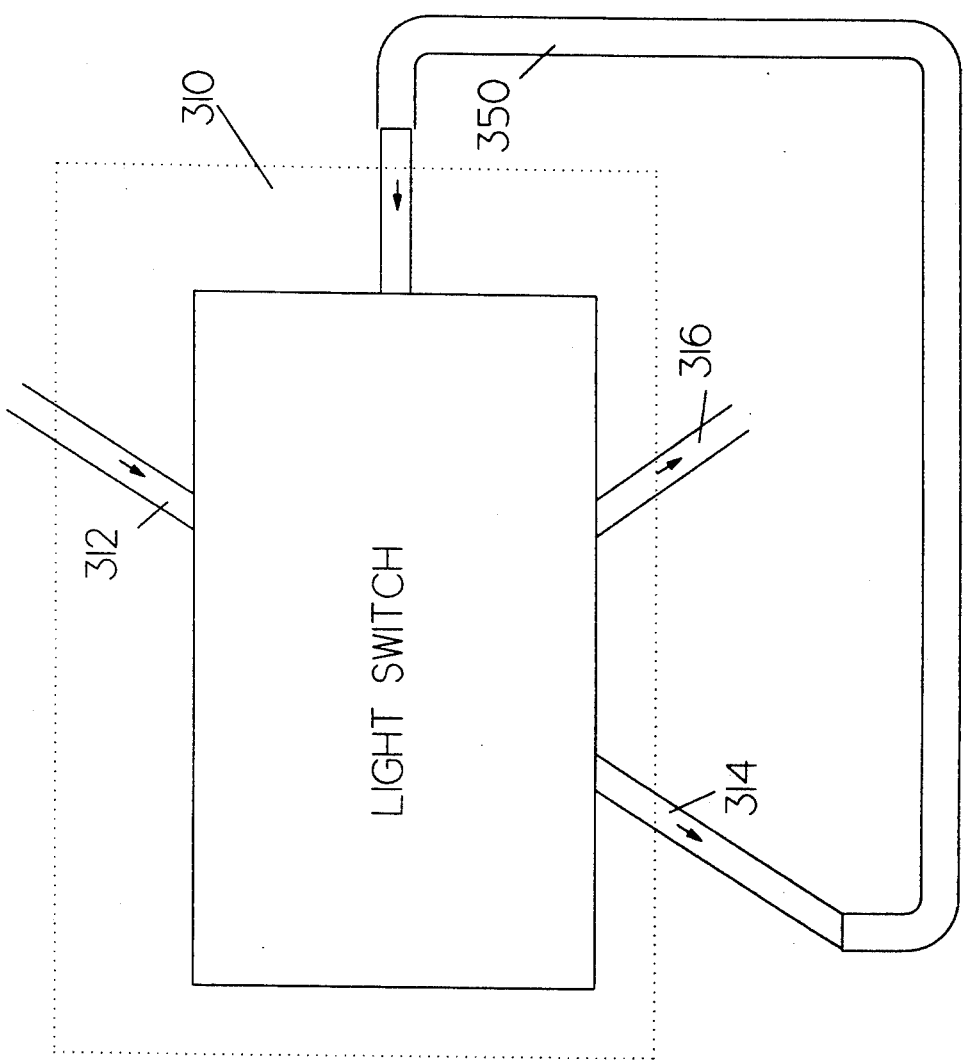
FIG. 9 is a diagram of an optical oscillator according to the present invention.

A diagram of the optical oscillator according to the present invention is shown in FIG. 9. Light switching device 310, as shown within the dotted lines in FIG. 9, is substantially identical to light switching device 210 described above and shown in FIGS. 6 and 7; hence, its elements are labeled with related numbers. Output light pipe 314 of light switching device 310 is connected to the input of optical delay line 350. The output of optical delay line 350 is connected to control light pipe 318 of light switching device 310. Optical delay line 350 preferably comprises a conventional optical fiber. The delay introduced into the optical path by this fiber is determined by its length, and is approximately 1 nsec/ft divided by the index of refraction of the fiber.

A steady light source is present at input light pipe 312. The delay time introduced by optical delay line 350 will be denoted by D. Thus, should light be present at output light pipe 314, it will, after time D, appear at control light pipe 318. However, as has been shown above with reference to the operation of the basic light switching device, when light is present at control light pipe 318, the light previously present at output light pipe 314 will be switched to output light pipe 316. And likewise, time D after the light has been switched off at output light pipe 314, there will no longer be light present at control light pipe 318, thus causing the light to be switched on again at output light pipe 314. It should be clear that the configuration of the optical oscillator shown in FIG. 9 will cause light at output light pipe 314 (and also, 180° out of phase, at output light pipe 316) to be switched on and off uniformly at a repetition rate of approximately 2D, essentially controlled by the length of the fiber optic delay line.

It will be apparent to those skilled in the electronic arts that the frequency of oscillation of the optical oscillator shown in FIG. 9, though controlled primarily by the length of the fiber optic delay line, will also be affected by the transient switching times inherent in the light switching device utilized in its construction. If the embodiment of the light switching device shown in FIGS. 6 and 7, the equivalent circuit of which is shown in FIG. 8, is used to construct an optical oscillator according to the present invention, it has been shown that a fast turn-off time is obtained by making $C_m$ much greater than $C_p$; this is achieved by altering the dielectric constant of the photoconductive region during fabrication.

The optical network interface station described above and shown in FIG. 5 also requires a pulse generator capable of generating light pulses of sufficient duration to activate the light switching devices comprising it. A light switching device according to the present invention may be used to construct an optical monostable multivibrator or "one-shot" which is capable of providing such pulses. An optical one-shot according to the present invention is comprised of two identical light switching devices. These light switching devices are interconnected in a manner which generates a light output pulse of adjustable width at the output port of the second of the two switching devices in response to the occurrence or transition of a light input signal at the control port to the first of the two switching devices. The width of this light output pulse is controlled by the delay generated in an optical delay line connecting the two light switching devices.

Figure 10:
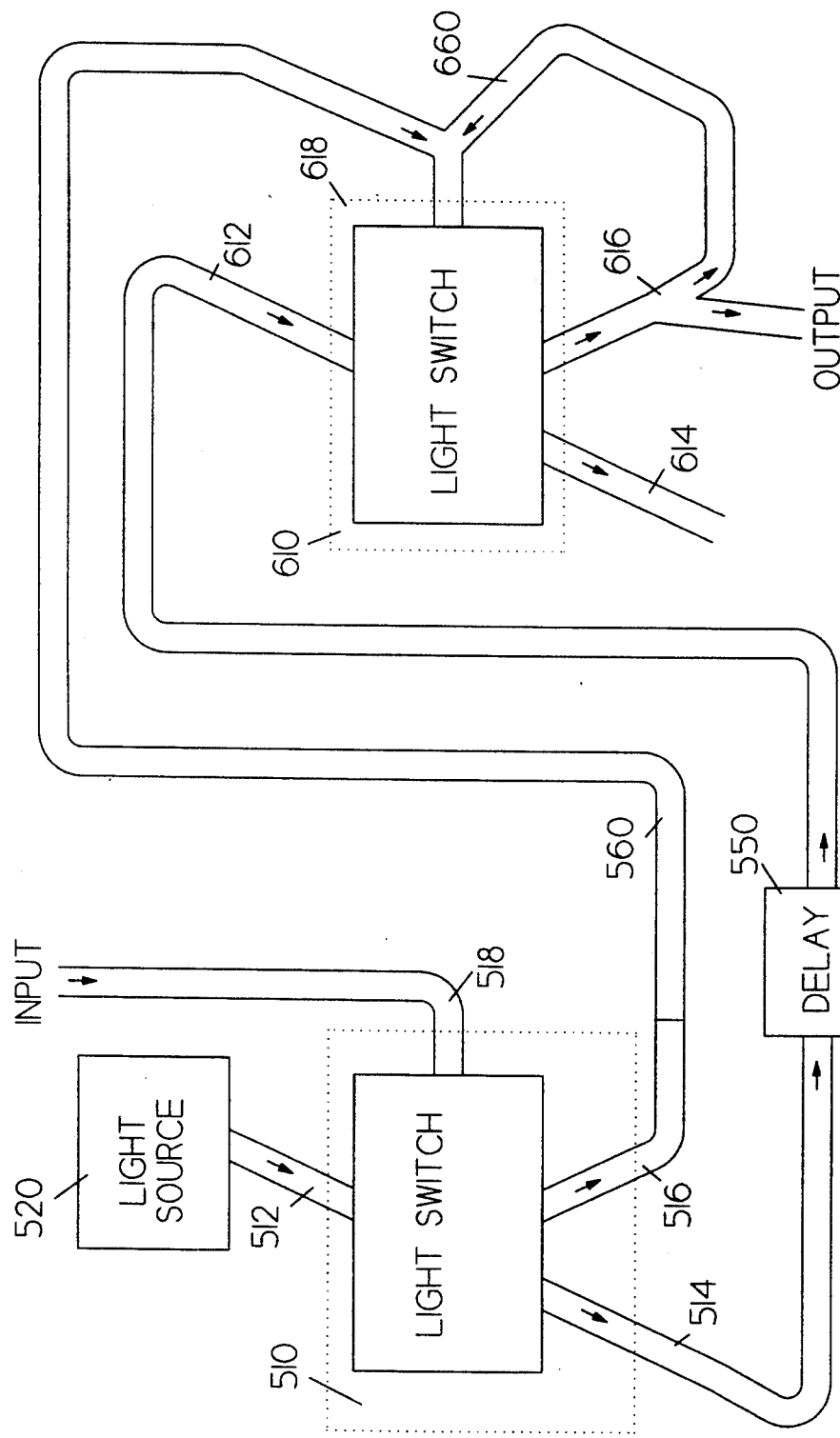
FIG. 10 is a diagram of an optical one-shot multivibrator according to the present invention.

A diagram of an optical one-shot according to the present invention is shown in FIG. 10. Light switching devices 510 and 610, shown within the broken lines in FIG. 10, are substantially identical to light switching device 210 described above and shown in FIGS. 6 and 7; hence, their elements are labeled with related numbers. Output light pipe 514 of light switching device 510 is connected to the input of optical delay line 550. The output of optical delay line 550 is connected to input light pipe 612 of light switching device 610. Optical delay line 550 preferably comprises a conventional optical fiber. The delay introduced into the optical path by this fiber is determined by its length, and is approximately 1 nsec/ft divided by the index of refraction of the fiber. The delay introduced by optical delay line 550 will be denoted by D.

A steady light source 520 is present at input light pipe 512 of light switching device 510. When a light signal is presented at control light pipe 518, light switching device 510, which serves as the input to the optical one-shot, causes the signal at output light pipe 514 to turn off, and causes the signal at output light pipe 516 to turn on. Since there was a light signal present at output light pipe 514 prior to the occurrence of the input signal at control light pipe 518, there will continue to be a signal present at the output of optical delay line 550, and thus at input light pipe 612 of light switching device 610, for a duration D after the onset of the input signal to light switching device 510.

Assume for the moment that the input signal to the optical one-shot is a positive light pulse of long duration, i.e., a pulse that lasts as long or longer than that which is generated by the one-shot; the one-shot does not require a long input pulse in order to operate, but this temporary assumption will simplify the explanation of the device's operation. As was shown above, the signal at output light pipe 516 of light switching device 510 turns on at the onset of the input signal to the optical one-shot, i.e., to control light pipe 518. Output light pipe 516 of light switching device 510 is connected to control light pipe 618 of light switching device 610. The occurrence of this signal at control light pipe 618 causes the signal at output light pipe 616 of light switching device 610 to turn on. By virtue of the above assumption, the input to the one-shot, and consequently the input to control light pipe 518, the output from output light pipe 516, and the input to control light pipe 618, will remain on for a time at least as long as the output pulse from the one-shot.

At a time D after the onset of the input to the optical one-shot, the output of delay line 550 turns off, as a consequence of the delayed output signal from output light pipe 512. Since this signal provides the input to input light pipe 612 of light switching device 610, there is no longer an input light beam to be reflected at the interface of light switching device 610, and the signal at output light pipe 616 turns off. Output light pipe 616 provides the output signal from the optical one-shot. Thus, the output of the one-shot, which was turned on at the onset of the input pulse, is turned off after a duration D even if there is still a signal present at the input to control light pipe 618.

If the input pulses to the optical one-shot are in all cases going to be long compared to the duration of the output pulses generated by the one-shot, then the circuit described above is sufficient for the operation of the device. However, one additional connection will permit the one-shot to operate on input pulses of any duration longer than the switching time of the light switching devices comprising it. This optical connection, shown as 660 in FIG. 10, feeds the signal from output light pipe 616 back to control light pipe 618. Thus, when the signal at output light pipe 616 turns on at the onset of the input pulse to the one-shot, it can then be used to maintain a signal at the input to control light pipe 618 even after the input to the one-shot, and thus the signal at output light pipe 516, has turned off. Consequently, the assumption that the input pulses must be of long duration is not necessary if this optional connection 660 has been effected.

There is one timing characteristic that is relevant with this optical one-shot, which holds true as well in the case of electrical one-shot circuits: A new timing cycle will begin if the input triggers again during the duration of the output pulse. If the input pulses are not spaced at least as far apart as the duration of the one-shot's output pulse, the output of the one-shot will produce one output pulse of the proper duration, and will then follow the input signal, i.e., it will retrigger on each input pulse, rather than producing output pulses of duration D, finally terminating one pulse width after the last input trigger.

In the optical one-shot described above, the signal at output light pipe 616 of light switching device 610, which is the output of the optical one-shot according to the present invention, turns on at the occurrence of an input signal, and turns off after a fixed duration, this time determined by the length of the fiber optic delay line. Thus, an optical one-shot having an appropriate delay can be utilized in the optical network interface device according to the present invention as a pulse generator capable of generating light pulses of sufficient duration to activate the light switching devices utilized in the network interface.

Finally, the manner in which a light switching device according to the present invention may be used to construct the sequence generators shown in FIGS. 3 and 4 will be explained. As noted above, a light switching device according to the present invention may be constructed from either a paraelectric or a ferroelectric material. In most applications, a paraelectric material is preferred because of the long reset time associated with a ferroelectric material. However, in constructing a sequence generator, the ferroelectric material is preferred.

Figure 11:
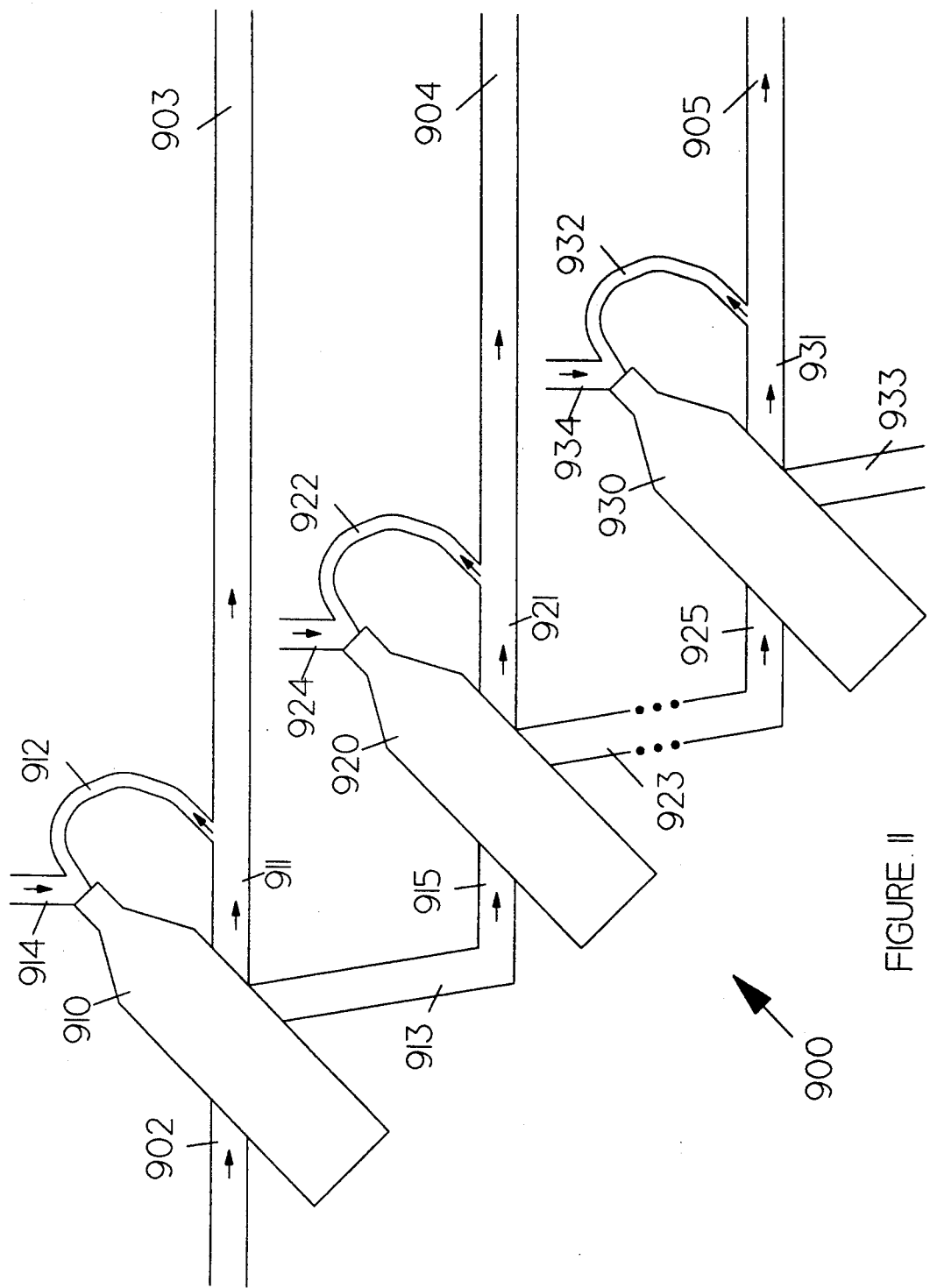
FIG. 11 is a diagram of a sequence generator according to the present invention.

A sequence generator according to the present invention is shown in FIG. 11 at 900. Sequence generator 900 has an input 902 for receiving a train of optical clock pulses 901 and a plurality of outputs. Exemplaru outputs are shown at 903-905. Each successive clock pulse is routed to a different output. That is, the first clock pulse is routed to output 903, the second clock pulse to output 904, and so on. A light switching device according to the present invention is associated with each output. The light switching devices are connected such that the switched output of each ligjt switching device is connected to the input of the next light switching device. The input of the first light switching device 910 is connected to the input to the sequence generator. The non-switched output of each light switching device is connected to the output of the sequence generator associated with that switching device. A portion of the light from the non-switched output of each light switching device is fed back to the control input of that light switching device by a light pipe. Exemplary feedback light pipes are shown at 912, 922, and 932.

The light switching devices comprising the sequence generator according to the present invention are constructed from a ferroelectric material. At the start of the sequence generation, the ferroelectric is polarized such that light received at the input to each light switching device is routed to the non-switched output thereof. Hence, when the first light pulse of the input light pulse train 901 is received by light switching device 910, the light pulse exits through the non-switched output of light switching device 910. This light pulse then exits sequence generator 900 via output light pipe 903. A portion of the light pulse is fed back to the control input of light switching device 910 via feedback light pipe 912. The fed-back light alters the polarization of light switching device 910; that is, it causes light switching devices 910 to switch such that all successive light pulses are routed through the switched output 913 of light switching device 910.

Hence, when the second light pulse of the input light pulse train 901 is received by light switching device 910, the light pulse is routed to the input 915 of light switching device 920. Since light switching device 920 is still in its initial state, this light pulse exits through the non-switched output of light switching device 920. This light pulse then exits sequence generator 900 via output light pipe 904. A portion of the light pulse is fed back to the control input of light switching device 920 via feedback light pipe 922. The fed-back light alters the polarization of light switching device 920, causing light switching device 920 to switch such that all successive light pulses are routed through the switched output 923 of light switching device 920.

This process continues until the last light pulse of the sequence exits through output light pipe 905. The next light pulse to enter input 902 will exit through output light pipe 905. The next light pulse to enter input 902 will exit through the switched output 933 of light switching device 930. This light pulse may be used to trigger a reset circuit which resets all of the light switching devices to the state in which input light pulses will exit through their non-switched outputs. As pointed out above, such a reset operation requires that the potential V across the light switching devices be varied according to a predetermined pattern while light is input to the control light pipe of each light switching device. To provide access for the reset light pulse, each light switching device includes a second light pipe connected to the control input thereof. Exemplary second light pipes are shown at 914, 924, and 934, respectively. Circuitry for providing the reset light signal and varying the potential V are conventional in the arts, and hence will not be discussed further here. It is sufficient to note that this circuitry need only be fast enough to reset the sequence generator before the next use thereof. This time will be determined by the operational speed of the computers on the network; hence, it is consistent with the normal switching times associated with conventional electronics.

There has been described herein an optical network interface device. Various modifications to the present invention will become apparent to those skilled in the art from the foregoing description and accompanying drawings. Accordingly, the present invention is to be limited solely by the scope of the following claims.

What is claimed is:

1. A light pulse generating device for generating a train of light pulses having a pattern determined by a numerical value represented by a plurality of binary bits, said light pulse generating device comprising:

register means for storing said binary bits, said register means comprising a plurality of storage cells, one said binary bit being stored in each said storage cell, each said storage cell comprising means for generating an electrical signal indicative of the binary bit stored therein and for coupling said electrical signal to an external device, said electrical signal having first and second values determined by said stored binary bit;

light generating means for generating a light signal of constant intensity;

a plurality of light switching devices arranged in a linear array having a first light switching device, one or more intermediate light switching devices and a last light switching device, one said light switching device being connected to each said storage cell, each said light switching device comprising an input light pipe, a control light pipe, an output light pipe, and an electrical input terminal, wherein said electrical input terminal is connected to said generating means in said storage cell connected thereto, said light switching devices being connected in series, said input light pipe of said first light switching device being connected to said light generating means and receives said light signal of constant intensity, said input light pipe of each said intermediate and last light switching device being connected to said output light pipe of the light switching device preceding said light switching device in said linear array, and wherein each said light switching device transmits light received through said input light pipe out of said output light pipe if said electrical input terminal is coupled to an electrical signal having said first value and each said light switching device blocks at least a portion of the light input through said input light pipe if said electrical signal has a second value and light is present in said control light pipe; and means for sequentially applying light pulses in a predetermined order to said control light pipes of said light switching devices.

2. A light pulse decoding device for generating electrical signals corresponding to light pulses in a train of light pulses, said pulse decoding device comprising:

means for receiving said train of light pulses;

a plurality of light switching devices arranged in a linear array having a first light switching device, one or more intermediate light switching devices and a last light switching device, each said light switching device comprising an input light pipe, a control light pipe, a first output light pipe, and a second output light pipe, said light switching devices being connected in series, said input light pipe of said first light switching device being connected to said receiving means so as to receive said train of light pulses, said input light pipe of each said intermediate and last light switching device being connected to said first output light pipe of the light switching device preceding said light switching device in said linear array, and wherein each said light switching device transmits the light received through said input light pipe out of said first output light pipe if no light is present in said control light pipe and each said light switching device directs at least a portion of the light input through said input light pipe into said second output light pipe if light is present in said control light pipe;

a plurality of photodetectors, one said photodetector being coupled to said second output light pipe of each said light switching device; and means for sequentially applying light pulses in a predetermined order to said control light pipes of said light switching devices.

3. The pulse decoding device of claim 2 further comprising a plurality of memory cells, one said memory cell being connected to each said photodetector, each said memory cell comprising means for storing a signal indicative of the output of said photodetector.

* * * * *

UNITED STATES PATENT AND TRADEMARK OFFICE
CERTIFICATE OF CORRECTION

PATENT NO. : 5,239,399
DATED : August 24, 1993
INVENTOR(S) : Evans, et al.

It is certified that error appears in the above-identified patent and that said Letters Patent is hereby corrected as shown below:

Column 10, line 46, after "91%" insert --lead--, before "lanthium" insert --9%--.

Column 16, lines 31-33, delete "The next light pulse to enter input 902 will exit through output light pipe 905."

Signed and Sealed this

Twenty-second Day of March, 1994

Attest:

BRUCE LEHMAN

Attesting Officer  Commissioner of Patents and Trademarks